(12) United States Patent
Patel et al.

(10) Patent No.: US 9,504,060 B2
(45) Date of Patent: *Nov. 22, 2016

(54) REDUCING INTERFERENCE BETWEEN WI-FI AND BLUETOOTH SIGNALS DURING VOICE CALLS

(71) Applicant: QUALCOMM Incorporated, San Diego, CA (US)

(72) Inventors: Saurabh Patel, Hyderabad (IN); Sundaresan Ramachandran, Hyderabad (IN); Srinivas Rao Uppala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,610

(22) Filed: Mar. 31, 2016

(65) Prior Publication Data

US 2016/0219609 A1 Jul. 28, 2016

Related U.S. Application Data

(63) Continuation of application No. 14/550,414, filed on Nov. 21, 2014, now Pat. No. 9,338,588.

(51) Int. Cl.

| *H04W 72/12* | (2009.01) |
|---|---|
| *H04W 72/08* | (2009.01) |
| *H04W 4/16* | (2009.01) |
| *H04W 4/00* | (2009.01) |
| *H04W 76/02* | (2009.01) |
| *H04M 1/725* | (2006.01) |

(Continued)

(52) U.S. Cl.
CPC ............ *H04W 72/1215* (2013.01); *H04L 1/00* (2013.01); *H04M 1/7253* (2013.01); *H04W 4/008* (2013.01); *H04W 4/16* (2013.01); *H04W 8/005* (2013.01); *H04W 48/16* (2013.01); *H04W 72/082* (2013.01); *H04W 76/023* (2013.01); *H04M 2250/02* (2013.01); *H04M 2250/06* (2013.01); *H04W 76/02* (2013.01); *H04W 84/12* (2013.01); *H04W 88/06* (2013.01)

(58) Field of Classification Search
CPC . H04M 1/7253; H04W 4/008; H04W 76/02; H04W 76/023; H04W 84/12
See application file for complete search history.

(56) References Cited

U.S. PATENT DOCUMENTS

| 8,831,675 B2* | 9/2014 | Wang ................... H04W 16/14 455/550.1 |
|---|---|---|
| 8,879,502 B2* | 11/2014 | Choi .................. H04W 36/0066 370/331 |

(Continued)

OTHER PUBLICATIONS

Chokshi R., "Yes! Wi-Fi and Bluetooth Can Coexist in Handheld Devices," Mar. 1, 2010, Technical Marketing Engineer, Emerging and Embedded Business Unit, Marvell Semiconductor, Inc., 9 pages.

*Primary Examiner* — Bobbak Safaipour
*Assistant Examiner* — Devan Sandiford
(74) *Attorney, Agent, or Firm* — Paradice and Li LLP (57) ABSTRACT

In a wireless network, a method for operating a wireless device including at least a cellular modem, a wireless local area network (WLAN) controller, and a Bluetooth (BT) controller, the method comprising facilitating a voice call with another device; generating a signal, from the cellular modem, indicating whether the cellular modem is active during the voice call; and selectively suppressing background scanning operations based, at least in part, on the signal.

29 Claims, 4 Drawing Sheets

(51) Int. Cl.
*H04W 8/00* (2009.01)
*H04L 1/00* (2006.01)
*H04W 48/16* (2009.01)
*H04W 84/12* (2009.01)
*H04W 88/06* (2009.01)

(56) References Cited

U.S. PATENT DOCUMENTS

| | | |
|---|---|---|
| 9,178,722 B1* | 11/2015 | Gong ................ H04W 36/0088 |
| 9,338,588 B1 | 5/2016 | Patel et al. |
| 2005/0276241 A1* | 12/2005 | Kamerman ........... H04W 28/06 |
| | | 370/328 |
| 2006/0205401 A1* | 9/2006 | Palin ................... H04M 1/2535 |
| | | 455/425 |
| 2008/0123610 A1* | 5/2008 | Desai ...................... H04L 47/14 |
| | | 370/339 |
| 2009/0170501 A1* | 7/2009 | Olson ............... H04W 36/0088 |
| | | 455/425 |
| 2010/0029204 A1* | 2/2010 | Gao ........................ H04B 1/715 |
| | | 455/41.2 |
| 2012/0218979 A1* | 8/2012 | Yeh ................... H04W 52/0216 |
| | | 370/338 |
| 2015/0004991 A1* | 1/2015 | Hara .................. H04W 52/0216 |
| | | 455/450 |
| 2015/0312857 A1* | 10/2015 | Kim .................. H04W 52/0222 |
| | | 370/311 |

* cited by examiner

REDUCING INTERFERENCE BETWEEN WI-FI AND BLUETOOTH SIGNALS DURING VOICE CALLS

CROSS-REFERENCE TO RELATED APPLICATION

This application claims priority under 35 U.S.C. 120 to co-pending and commonly owned U.S. patent application Ser. No. 14/550,414 entitled "REDUCING INTERFERENCE BETWEEN WI-FI AND BLUETOOTH SIGNALS DURING VOICE CALLS" filed on Nov. 21, 2014, the entirety of which is incorporated by reference herein.

TECHNICAL FIELD

The present embodiments relate generally to wireless networks, and specifically reducing interference in wireless networks.

BACKGROUND OF RELATED ART

Many wireless devices such as smartphones and tablet computers are capable of wireless communication with other devices using multiple technologies, including Wi-Fi signals (e.g., 900 MHz, 2.4 GHz, and 5 GHz signaling), BLUETOOTH® (BT or Bluetooth) signals, near field communication (NFC) signals, and cellular signals such as long term evolution (LTE) signals. Because BT signals and Wi-Fi signals may be transmitted at similar frequencies (e.g., in the ISM band, between approximately 2.4 and 2.5 GHz), it is desirable for devices that include both BT and Wi-Fi transceivers to reduce interference between the BT and Wi-Fi signals. For example, when a wireless device is facilitating a Synchronous Connection Oriented (SCO) call via a wireless link to a BT headset, concurrent reception (or transmission) of Wi-Fi signals may interfere with the BT signals, which in turn may degrade the Mean Opinion Score (MOS) of the SCO call.

Thus, it is desirable to reduce interference between BT and Wi-Fi signals, particularly during an SCO call routed to a BT-enabled headset.

BRIEF DESCRIPTION OF THE DRAWINGS

The example embodiments are illustrated by way of example and are not intended to be limited by the figures of the accompanying drawings, where like reference numerals refer to corresponding parts throughout the drawing figures.

DETAILED DESCRIPTION

The example embodiments are described below in the context of mobile stations (STAs) for simplicity only. It is to be understood that the example embodiments are equally applicable for other types of devices. As used herein, the terms "wireless local area network (WLAN)" and "Wi-Fi" can include communications governed by the IEEE 802.11 family of standards, the term "Bluetooth" can include communications governed by the IEEE 802.15 family of standards and/or governed by HiperLAN (a set of wireless standards, comparable to the IEEE 802.11 standards, used primarily in Europe), and the term "LTE" can include cellular communications associated with Long Term Evolution standards and/or other cellular communication standards (e.g., GSM). While examples in the current application relate to WLAN, Bluetooth, and LTE communications, they are only for example and should not limit embodiments as various different wide area network (WAN) and other wireless communications may be used when employing embodiments of the present disclosure.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

Figure 1:
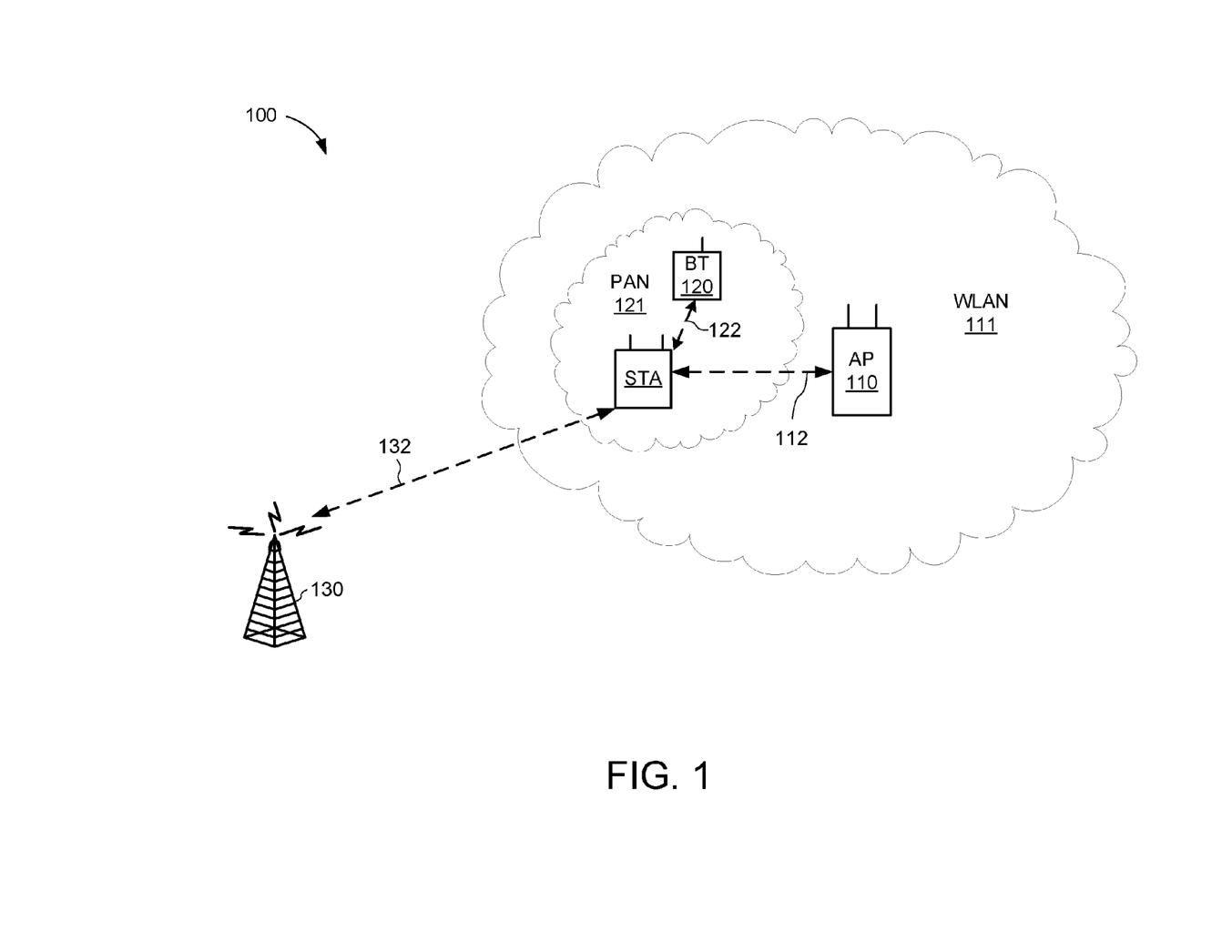
FIG. 1 shows a block diagram of a wireless system within which the example embodiments may be implemented.

FIG. 1 is a block diagram of a wireless network system 100 within which the example embodiments may be implemented. The system 100 is shown to include a wireless station (STA), a wireless access point (AP) 110, a wireless local area network (WLAN) 111, a Bluetooth headset 120, a personal area network (PAN) 120, and a cellular base station 130. The WLAN 111 may be formed by a plurality of access points (APs) that may operate according to the IEEE 802.11 family of standards (or according to other suitable wireless protocols). Thus, although only one AP 110 is shown in FIG. 1 for simplicity, it is to be understood that WLAN 111 may be formed by any number of access points such as AP 110. The AP 110 is assigned a unique MAC address that is programmed therein by, for example, the manufacturer of the access point. Similarly, the STA is also assigned a unique MAC address. Once the STA is authenticated to and associated with the AP 110, the STA and the AP 110 may exchange data via a Wi-Fi link 112.

The PAN 121, which may also be referred to as a Bluetooth network, may be created by pairing the STA and the Bluetooth headset 120 so that data may be exchanged between the STA with Bluetooth headset 120 via a Bluetooth link 122. For example, when the STA is facilitating a voice call, the STA may route audio signals as a Synchronous Connection Oriented (SCO) call via the Bluetooth link 122 to BT headset 120.

Cellular base station 130 may exchange cellular signals with the STA over a cellular link 132. The cellular base station 130 may operate according to any suitable cellular communication protocol including, for example, a Long Term Evolution (LTE) protocol, a Code Division Multiple Access (CDMA) protocol, a Global System for Mobile Communications (GSM) protocol, or some other wireless system. A CDMA protocol may implement Wideband CDMA (WCDMA), CDMA 1, Evolution-Data Optimized (EVDO), Time Division Synchronous CDMA (TD-SCDMA), or some other version of CDMA.

The STA may be any suitable Wi-Fi enabled wireless device including, for example, smartphones, personal digital assistants (PDAs), tablet devices, laptop computers, or the like. For at least some embodiments, the STA may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 4.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 4.

As mentioned above, for wireless devices (e.g., STAs) that include collocated Bluetooth (BT) and Wi-Fi transceivers, it is desirable to reduce interference between the BT and Wi-Fi signals, particularly when both the BT and Wi-Fi signals are transmitted at similar frequencies (e.g., in the ISM band, between approximately 2.4 and 2.5 GHz). More specifically, even though BT signals may utilize adaptive frequency hopping (AFH) techniques to avoid specific frequencies used by Wi-Fi transmissions, AFH techniques may not adequately mitigate interference, especially when Wi-Fi and BT transceivers are integrated into the same device (e.g., as in the STA of FIG. 1). Thus, when a wireless device such as the STA of FIG. 1 is facilitating an SCO call via BT headset 120, concurrent reception (or transmission) of Wi-Fi signals may interfere with the exchange of BT signals between the STA and BT headset 120, which in turn may degrade the audio quality (e.g., the MOS) of the SCO call.

Accordingly, example embodiments disclosed herein may reduce interference between Wi-Fi signals and BT signals during an SCO call by selectively suppressing background scanning operations based, at least in part, on whether the voice call is facilitated using a cellular communication protocol (e.g., using cellular base station 130) or facilitated using a Wi-Fi communication protocol (e.g., using WLAN AP 110). For at least some embodiments, the STA may prevent the background scanning operations during the voice call when the voice call is facilitated using Wi-Fi signals, and may allow the background scanning operations to occur during the voice call when the voice call is facilitated using cellular signals (e.g., particularly when the cellular signals are transmitted at frequencies other than between approximately 2.4 and 2.48 GHz). These and other details of the example embodiments are described in more detail below.

Figure 2:
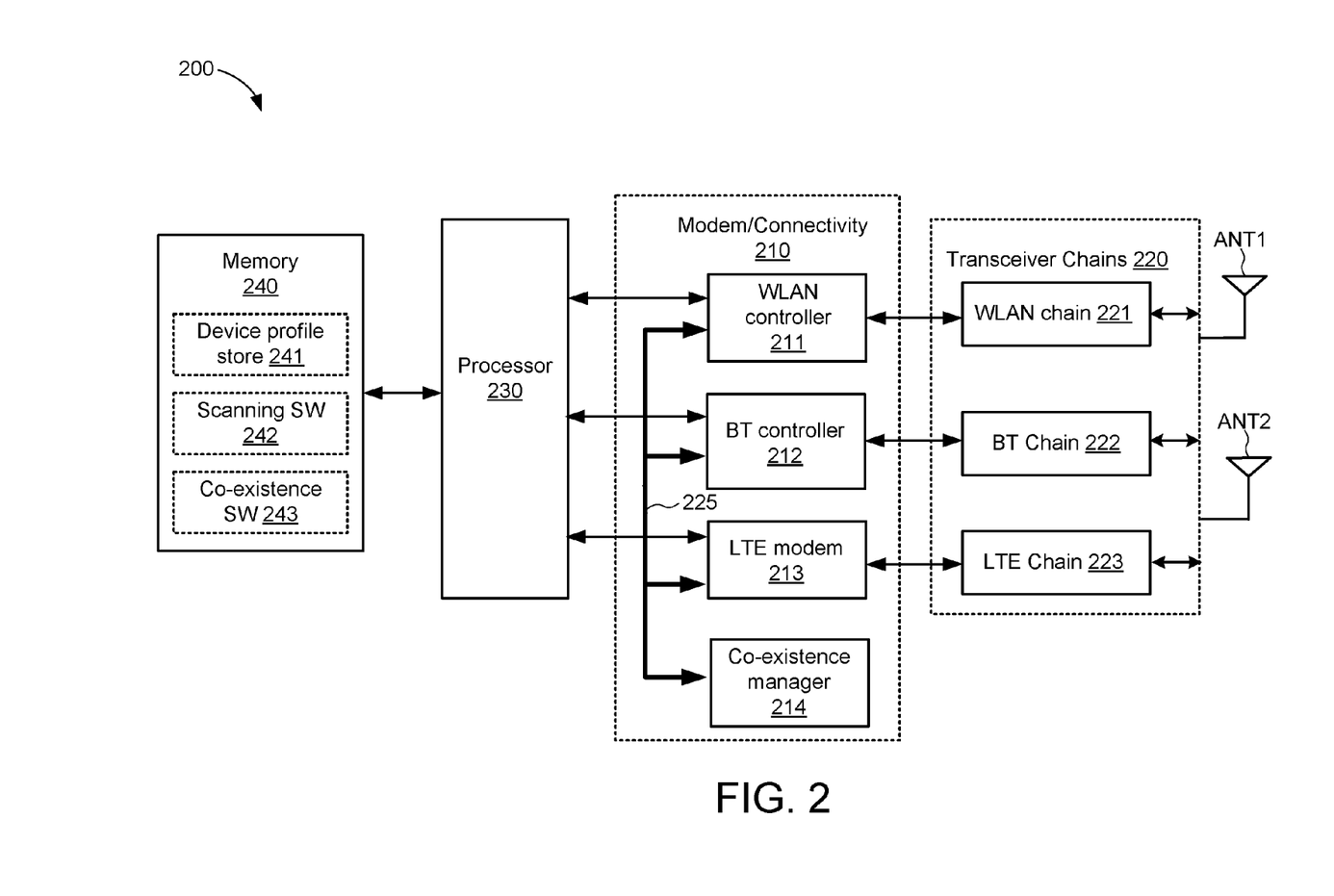
FIG. 2 shows a block diagram of a wireless station (STA) in accordance with some embodiments.

FIG. 2 is a functional block diagram of a STA 200 that may be one embodiment of the STA of FIG. 1. STA 200 is shown to include a modem/connectivity module 210, transceiver chains 220, a bus 225, a processor 230, a memory 240, and two antennas ANT1 and ANT2. The modem/connectivity module 210 includes a WLAN controller 211, a Bluetooth controller 212, a cellular modem (e.g., an LTE modem 213), and a co-existence manager 214. The WLAN controller 211 is configured to control the transmission and reception of Wi-Fi signals for STA 200. The Bluetooth controller 212 is configured to control the transmission and reception of Bluetooth signals for STA 200. The LTE modem 213 is configured to control the transmission and reception of LTE or other cellular signals for STA 200. Alternatively, the cellular modem may be a modem incorporating different or multiple technologies (e.g., EDGE, EGPRS, Evolved EDGE, HSPA, HSPA+, 3G, etc.).

The WLAN controller 211, Bluetooth controller 212, and LTE modem 213 may be coupled to processor 230 via separate signal lines, and are coupled to each other and to co-existence manager 214 via bus 225. For some embodiments, the bus 225 is a Wireless Co-existence Interface (WCI) bus that may operate according to one or more Bluetooth standards. For such embodiments, the WCI bus 225 may be used to exchange synchronization messages and status information between WLAN controller 211, Bluetooth controller 212, LTE modem 213, and co-existence manager 214. For at least some embodiments, the LTE modem 213 may correspond to a mobile station modem (MSM), and the WLAN controller 211 and Bluetooth controller 212 may correspond to a wireless connectivity module.

Although shown in FIG. 2 as separate components, the WLAN controller 211, Bluetooth controller 212, LTE modem 213, and co-existence manager 214 may be implemented on the same integrated circuit (IC) chip. For other embodiments, the WLAN controller 211, Bluetooth controller 212, LTE modem 213, and co-existence manager 214 may share one or more components on the same chip.

Note that the various components (not shown for simplicity) within processor 230, WLAN controller 211, Bluetooth controller 212, LTE modem 213, and/or co-existence manager 214 may be implemented in a variety of ways including, for example, using analog logic, digital logic, processors (e.g., CPUs, DSPs, microcontrollers, and so on), application specific integrated circuits (ASICs), field programmable gate arrays (FPGAs), or any combination of the above. For purposes of this disclosure, modem/connectivity module 210 may include not only digital processing circuitry but also analog (e.g., RF) processing circuitry. Additionally, co-existence manager 214 (and/or portions of the controllers) may comprise instructions stored in memory 240 for execution by the processor 230 (e.g., co-existence SW 243) to cause the device to manage co-existence of concurrent communications.

Transceiver chains 220 are coupled between modem/connectivity module 210 and antennas ANT1 and ANT2. Although not shown in FIG. 2 for simplicity, transceiver chains 220 may include suitable transceivers and/or associated circuits (e.g., power amplifiers, filters, up-samplers, down-samplers, analog-to-digital converters, digital-to-analog converters, mixers, etc.) to facilitate the transmission and reception of various wireless signals. Transceiver chains 220 may include a WLAN chain 221 to exchange Wi-Fi signals between WLAN controller 211 and ANT1/ANT2, a Bluetooth chain 222 to exchange Bluetooth signals between Bluetooth controller 212 and ANT1/ANT2, and an LTE chain 223 to exchange LTE signals (or other cellular signals) between LTE modem 213 and ANT1/ANT2.

Although not shown for simplicity, STA 200 may also include antenna sharing logic that may selectively couple the WLAN controller 211, the Bluetooth controller 212, and the LTE modem 213 to the antennas ANT1/ANT2. For example, when one of the WLAN controller 211, the Bluetooth controller 212, or the LTE modem 213 is not transmitting or receiving data, the antenna sharing logic may provision the antennas ANT1/ANT2 for use by the other two controllers.

During operation of STA 200, processor 230 may provide data for transmission according to WLAN protocols to the WLAN controller 211, provide data for transmission according to Bluetooth protocols to the Bluetooth controller 212, and/or provide data for transmission according to LTE protocols to the LTE modem 213. If the LTE modem 213 is currently transmitting or receiving data, then the WLAN controller 211 may enter into a co-existence mode to reduce interference between Wi-Fi signals and LTE signals. During the co-existence mode, the WLAN controller 211 may employ a number of interference reduction techniques such as, for example, selectively adjusting the transmission rate and/or the power level of WLAN signals transmitted from the STA 200. Because WLAN throughput is reduced during the co-existence mode, it is desirable to avoid the co-existence mode when possible.

The co-existence manager 214 may coordinate the transmission/reception of Wi-Fi signals with the transmission/reception of BT signals, for example, to reduce interference between the Wi-Fi signals and the BT signals. For some embodiments, the co-existence manager 214 may receive transmit/receive information from the WLAN controller 211 and/or the BT controller 212. For other embodiments, the co-existence manager 214 may receive Wi-Fi and/or BT transmit/receive information from processor 230.

Memory 240 may include a profile data store 241 that stores profile information for a plurality of devices such as APs, Bluetooth devices, and/or other STAs. The profile information for a particular device may include information including, for example, the device's SSID, address, channel information, RSSI values, supported data rates, BT pairing information, and any other suitable information pertaining to or describing the operation of the device.

Memory 240 may also include a non-transitory computer-readable medium (e.g., one or more nonvolatile memory elements, such as EPROM, EEPROM, Flash memory, a hard drive, and so on) that can store the following software modules:
  a scanning software module 242 to facilitate background scanning operations; and
  a co-existence software module 243 to selectively suppress background scanning operations based, at least in part, on whether the STA 200 is facilitating a voice call using WLAN controller 211 or LTE modem 213. Each software module includes instructions that, when executed by processor 230, cause STA 200 to perform the corresponding functions. The non-transitory computer-readable medium of memory 240 thus includes instructions for performing all or a portion of the operations depicted in FIG. 4. In another embodiment, the device profile store 241 may also be embodied in a software module stored on the non-transitory computer-readable medium.

Processor 230 may be one or more suitable processors capable of executing scripts or instructions of one or more software programs stored in STA 200 (e.g., within memory 240). For example, processor 230 may execute scanning software module 242 to facilitate background scanning operations. The background scanning operations may include Wi-Fi and/or Bluetooth scanning operations.

The Wi-Fi scanning operations may include both passive scanning and active scanning operations. For example, in passive scanning, the STA 200 may scan individual channels for beacon frames that are periodically transmitted by nearby APs. The beacon frame includes the AP's SSID, supported data rates, synchronization information, and so on. When the STA 200 receives a beacon frame, the STA 200 may record information associated with the beacon frame (e.g., corresponding power levels and RSSI values) and thereafter use this information to select which AP to associate with. In active scanning, the STA 200 tries to locate nearby APs, and initiates the scanning process by broadcasting probe request frames. This allows the STA 200 to receive immediate responses from APs (e.g., without waiting for transmission of beacon frames).

BT scanning operations, which may be used to find and locate other BT devices to pair with, may include page scans and/or inquiry scans. Page scans may be defined as a sub-state in which the STA 200 listens for its own device access code (DAC) for the duration of a scan window, and is typically used to set up the BT link between devices. Inquiry scan is similar to page scan, except that in this sub-state the receiving device scans for the inquiry access code (IAC).

Referring also to FIG. 1 in discussing FIG. 2, when STA 200 commences an SCO call via its Bluetooth controller 212 and routes audio signals to BT headset 120, the STA 200 may determine whether the corresponding voice call is facilitated using cellular communication protocols via LTE modem 213 or using WLAN communication protocols via WLAN controller 211. When the voice call uses LTE modem 213, the STA 200 may allow WLAN and/or BT background scanning operations, for example, because the LTE signals may not be using similar frequency bands as the BT signals. For example, when the LTE modem is using LTE band 12 (e.g., approximately 700 MHz), then the STA 200 may perform WLAN scanning operations and/or BT scanning operations (e.g., in the ISM frequency band) without degrading the audio quality (e.g., the MOS) of the BT link 122 between STA 200 and BT headset 120 because of channel separate between the LTE signals and the Wi-Fi/BT signals.

Conversely, when the voice call uses WLAN controller 211 (e.g., to perform a voice-over-Internet Protocol (VoIP) call), then the STA 200 may prevent WLAN and/or BT background scanning operations, for example, because the WLAN signals may use similar frequency bands as the BT signals. For example, when both the WLAN signals and the BT signals are using the ISM frequency band, then performing WLAN and/or BT background scanning operations may interfere with the exchange of WLAN voice packets between STA 200 and AP 110, which in turn may degrade the audio quality (e.g., the MOS) of the BT link 122 between STA 200 and BT headset 120.

For some embodiments, the processor 230 and/or the co-existence manager 214 may query the LTE modem 213 during the voice call to determine whether the LTE modem 213 is active (e.g., whether the LTE modem 213 is facilitating the voice call). For example, referring also to FIG. 3, after the STA starts an SCO call with the BT headset 120, the connectivity sub-system (e.g., which includes the WLAN controller 211 and the BT controller 212), may send a status request (REQ) to the modem sub-system (e.g., the LTE modem 213). If the LTE modem 213 is active, then the modem sub-system may respond with a status response (RESP) signal indicating that the LTE modem 213 is active. In response thereto, the processor 230 and/or the co-existence manager 214 may determine that the voice call is facilitated using LTE signals that would not be interfered by WLAN and/or BT background scanning operations, and thus may allow the WLAN and/or BT background scanning operations to occur during the voice call.

Figure 3:
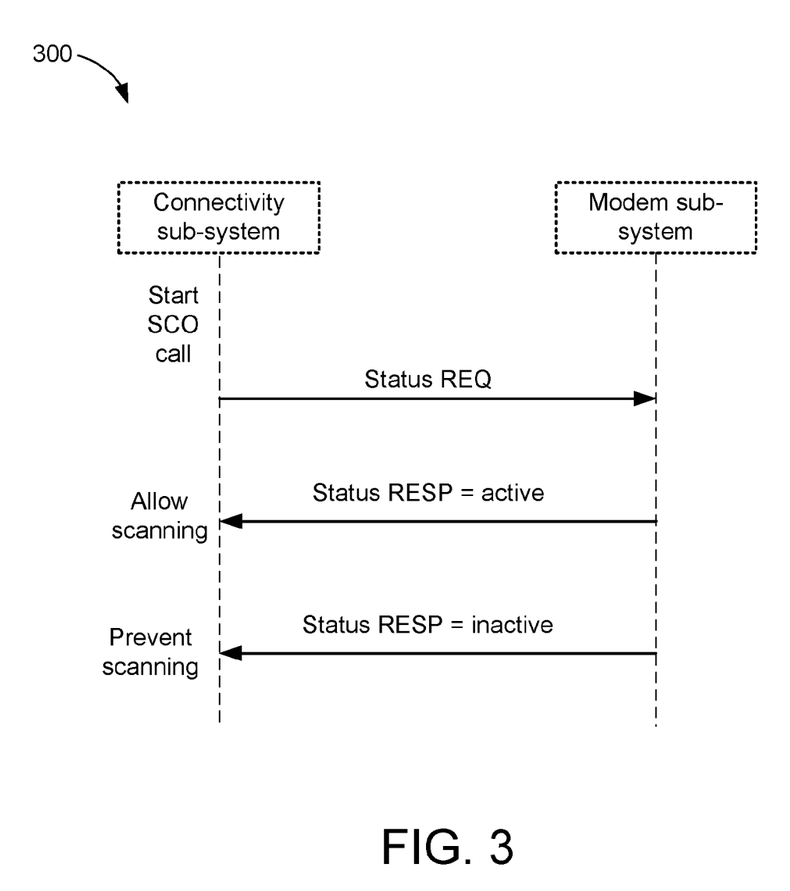
FIG. 3 is a sequence diagram depicting an example operation in accordance with some embodiments.

Conversely, if the LTE modem 213 is not active, then the modem sub-system may respond with a RESP signal indicating that the LTE modem 213 is inactive. In response thereto, the processor 230 and/or the co-existence manager 214 may determine that the voice call is facilitated using WLAN signals that may be interfered by WLAN and/or BT background scanning operations, and thus may prevent the WLAN and/or BT background scanning operations during the voice call. In this manner, the STA 200 may suppress the background scanning operations only when the scanning operations degrade the MOS of the voice call by a threshold amount; otherwise, the STA 200 may allow the background scanning operations to occur during the voice call. This is in contrast to previous techniques that suppress all WLAN and BT scanning operations during an SCO call without regard to whether the voice call is a cellular call facilitated by LTE modem 213 or is a VoIP call facilitated by WLAN controller 211.

For other embodiments, the LTE modem 213 may generate an signal indicating whether the LTE modem 213 is currently active or inactive (e.g., without being requested by the processor 230 and/or co-existence manager 214), and the processor 230 and/or co-existence manager 214 may selectively suppress the background scanning operations based, at least in part, on whether the signal indicates that the LTE modem 213 is active or inactive during the SCO call.

Figure 4:
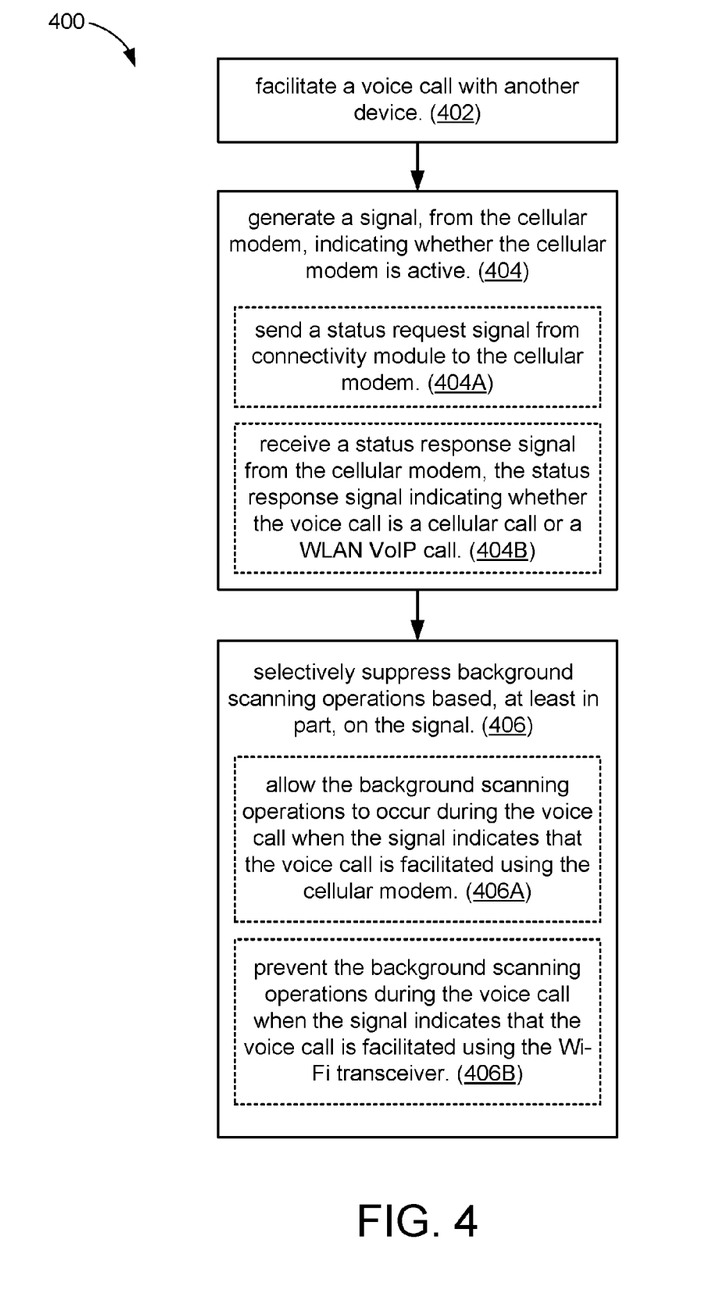
FIG. 4 is an illustrative flow chart depicting an example operation for selectively suppressing background scanning operations during an SCO call to a associated BT-enabled headset in accordance with some embodiments.

FIG. 4 shows a flow chart depicting an example operation 400 in accordance with the embodiments. Referring also to FIG. 2 in discussing FIG. 4, a wireless device (e.g., STA 200) may facilitate a voice call with another device (402). The wireless device may generate a signal, from the cellular modem, indicating whether the cellular modem is active (404). For some embodiments, the connectivity sub-system (e.g., the co-existence manager 214) or the processor 230 may send a status REQ to the modem sub-system (e.g., the LTE modem 213) (404A). In response thereto, the modem sub-system sends a status RESP signal to the connectivity sub-system (or processor 230) indicating whether the LTE modem 213 is active or inactive during the SCO call. The connectivity sub-system (e.g., the co-existence manager 214) or the processor 230 receives the status RESP signal indicating whether the voice call is a cellular call or a WLAN VoIP call (404B).

The wireless device may selectively suppress background scanning operations based, at least in part, on the signal (406). For at least some embodiments, when the signal indicates that the voice call is facilitated using the cellular modem, the wireless device may allow the background scanning operations to occur during the voice call (406A); conversely, when the signal indicates that the voice call is facilitated using the WLAN controller, the wireless device may prevent the background scanning operations during the voice call (406B). In addition, for at least one embodiment, when the SCO call is routed to the BT headset 120, the wireless device may suppress the background scanning operations only while the SCO call is routed to the BT headset 120.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for operating a wireless device including at least a cellular modem, a wireless local area network (WLAN) controller, and a Bluetooth controller, the method comprising:
    facilitating a voice call with another device using either the cellular modem or the WLAN controller;
    determining whether the cellular modem is facilitating the voice call; and
    suppressing WLAN scanning operations during the voice call if determined that the cellular modem is not facilitating the voice call.

2. The method of claim 1, wherein the determining comprises:
    generating a signal indicating whether the cellular modem is facilitating the voice call.

3. The method of claim 2, wherein the signal is generated in response to a status request from the WLAN controller.

4. The method of claim 1, further comprising:
    allowing the WLAN scanning operations during the voice call if determined that the cellular modem is facilitating the voice call.

5. The method of claim 1, wherein the WLAN scanning operations comprise at least one member from the group consisting of transmitting probe requests and receiving beacon frames.

6. The method of claim 1, wherein the voice call comprises a Synchronous Connection Oriented (SCO) call.

7. The method of claim 6, further comprising:
    routing the SCO call to a Bluetooth headset using the Bluetooth controller; and
    suppressing Bluetooth scanning operations during the SCO call.

8. The method of claim 7, wherein the Bluetooth scanning operations comprise at least one member from the group consisting of Bluetooth page scans and Bluetooth inquiry scans.

9. A wireless device, comprising:
    a cellular modem;
    a wireless local area network (WLAN) controller;
    a Bluetooth controller;
    a processor; and
    a memory storing instructions that, when executed by the processor, cause the wireless device to:
        facilitate a voice call with another device using either the cellular modem or the WLAN controller;
        determine whether the cellular modem is facilitating the voice call; and
        suppress WLAN scanning operations during the voice call if determined that the cellular modem is not facilitating the voice call.

10. The wireless device of claim 9, wherein execution of the instructions to determine whether the cellular modem is facilitating the voice call causes the wireless device to:
    generate a signal indicating whether the cellular modem is facilitating the voice call.

11. The wireless device of claim 10, wherein the signal is generated in response to a status request from the WLAN controller.

12. The wireless device of claim 9, wherein execution of the instructions causes the wireless device to further:

allow the WLAN scanning operations during the voice call if determined that the cellular modem is facilitating the voice call.

13. The wireless device of claim 9, wherein the WLAN scanning operations comprise at least one member from the group consisting of transmitting probe requests and receiving beacon frames.

14. The wireless device of claim 9, wherein the voice call comprises a Synchronous Connection Oriented (SCO) call.

15. The wireless device of claim 14, wherein execution of the instructions causes the wireless device to further:
route the SCO call to a Bluetooth headset using the Bluetooth controller; and
suppress Bluetooth scanning operations during the SCO call.

16. The wireless device of claim 15, wherein the Bluetooth scanning operations comprise at least one member from the group consisting of Bluetooth page scans and Bluetooth inquiry scans.

17. A non-transitory computer-readable medium containing program instructions that, when executed by a processor of a wireless device including a cellular modem, a wireless local area network (WLAN) controller, and a Bluetooth controller, cause the wireless device to perform operations comprising:
facilitating a voice call with another device using either the cellular modem or the WLAN controller;
determining whether the cellular modem is facilitating the voice call; and
suppressing WLAN scanning operations during the voice call if determined that the cellular modem is not facilitating the voice call.

18. The non-transitory computer-readable medium of claim 17, wherein execution of the instructions for determining whether the cellular modem is facilitating the voice call causes the wireless device to perform operations further comprising:
generating a signal indicating whether the cellular modem is facilitating the voice call.

19. The non-transitory computer-readable medium of claim 18, wherein the signal is generated in response to a status request from the WLAN controller.

20. The non-transitory computer-readable medium of claim 17, wherein execution of the instructions causes the wireless device to perform operations further comprising:
allowing the WLAN scanning operations during the voice call if determined that the cellular modem is facilitating the voice call.

21. The non-transitory computer-readable medium of claim 17, wherein the WLAN scanning operations comprise at least one member from the group consisting of transmitting probe requests and receiving beacon frames.

22. The non-transitory computer-readable medium of claim 17, wherein the voice call comprises a Synchronous Connection Oriented (SCO) call.

23. The non-transitory computer-readable medium of claim 22, wherein execution of the instructions causes the wireless device to perform operations further comprising:
routing the SCO call to a Bluetooth headset using the Bluetooth controller; and
suppressing Bluetooth scanning operations during the SCO call.

24. The non-transitory computer-readable medium of claim 23, wherein the Bluetooth scanning operations comprise at least one member from the group consisting of Bluetooth page scans and Bluetooth inquiry scans.

25. A wireless device including at least a cellular modem, a wireless local area network (WLAN) controller, and a Bluetooth controller, the wireless device comprising:
means for facilitating a voice call with another device;
means for determining whether the cellular modem is facilitating the voice call; and
means for suppressing WLAN scanning operations during the voice call if determined that the cellular modem is not facilitating the voice call.

26. The wireless device of claim 25, wherein the means for determining further comprises:
means for generating a signal indicating whether the cellular modem is facilitating the voice call.

27. The wireless device of claim 25, further comprising:
means for allowing the WLAN scanning operations during the voice call if determined that the cellular modem is facilitating the voice call.

28. The wireless device of claim 25, wherein the WLAN scanning operations comprise at least one member from the group consisting of transmitting probe requests and receiving beacon frames.

29. The wireless device of claim 25, wherein the voice call comprises a Synchronous Connection Oriented (SCO) call, the wireless device further comprising:
means for routing the SCO call to a Bluetooth headset; and
means for suppressing Bluetooth scanning operations during the SCO call.

* * * * *